United States Patent [19]

Lin

[11] Patent Number: 5,425,450

[45] Date of Patent: Jun. 20, 1995

[54] COMPACT DISK CARRYING CASE

[76] Inventor: Shih-Hsien Lin, No. 34, Alley 19, Lane 325, Chien Kang Rd., Taipei, Taiwan, Prov. of China

[21] Appl. No.: 266,507

[22] Filed: Jun. 27, 1994

[51] Int. Cl.6 ............... B65D 85/30; B65D 21/00
[52] U.S. Cl. .................... 206/310; 206/503; 206/308.1
[58] Field of Search ............ 206/309, 310, 312, 387, 206/444, 503; 312/9.48, 9.51

[56] References Cited

U.S. PATENT DOCUMENTS

| | | | |
|---|---|---|---|
| 4,265,369 | 5/1981 | Aboussouan | 206/387 X |
| 5,154,291 | 10/1992 | Sur | 206/387 X |
| 5,191,983 | 3/1993 | Hardy | 206/387 X |
| 5,244,084 | 9/1993 | Chan | 206/309 |
| 5,360,107 | 11/1994 | Chasin et al. | 206/444 X |

*Primary Examiner*—Jimmy G. Foster
*Assistant Examiner*—BethAnne C. Cicconi
*Attorney, Agent, or Firm*—Morton J. Rosenberg; David I. Klein

[57] ABSTRACT

A compact disc carrying case including an upper cover having a first hole at a front corner and a second hole at both rear corners, a lower cover slidably engaged with said upper cover and having a first cylindrical member with a counterbored hole at both rear corners and a second cylindrical member with a through hole at a front corner, a disk holder pivotally connected with the cylindrical member of the lower cover and having a retainer at a center, a securing bolt having a threaded rod and a head with a threaded hole and inserted into the counterbored hole of the lower cover, whereby a plurality of carrying cases can be conveniently kept together as a storage cabinet.

3 Claims, 11 Drawing Sheets

COMPACT DISK CARRYING CASE

BACKGROUND OF THE INVENTION

It has been found that the conventional compact disk carrying case consists of an upper cover, a lower cover hingedly connected with the upper cover at one side, and a disc holder fitted in the lower cover. The upper cover is formed at both sides with a vertical side wall having a protuberance. The lower cover is formed at both sides with a cavity adapted to receive the protuberance of the upper cover. The disc holder is formed with a retainer at the center for keeping a compact disc in place. However, it is often confusing as to finding out the correct direction to open the compact disc carrying case. Furthermore, the hinge connection between the upper cover and the lower cover is so weak that it will be easily broken when dropping down on the ground.

Figure 10:
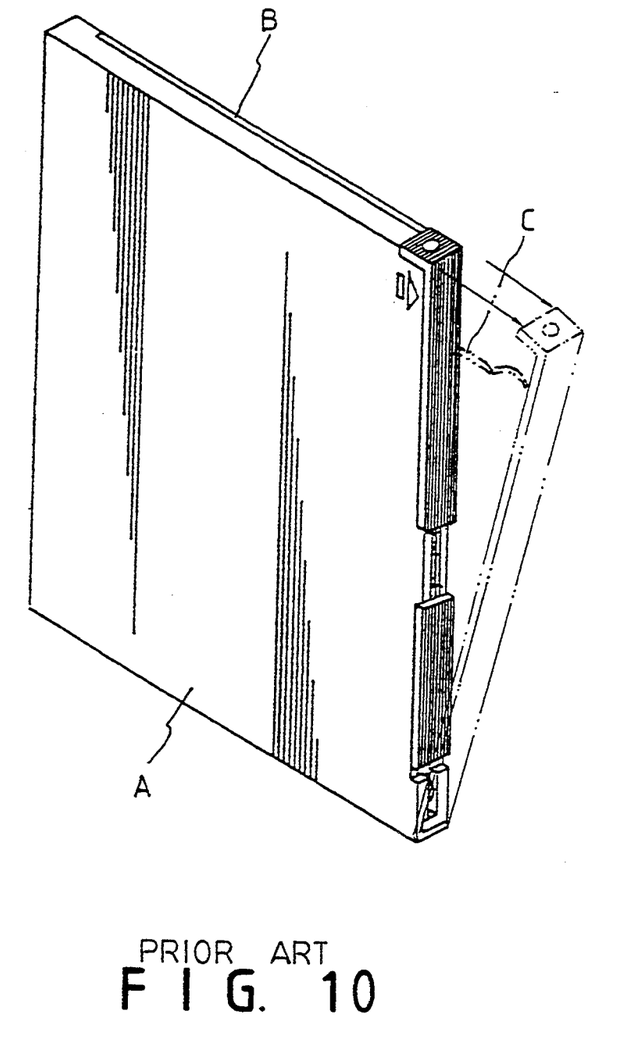
FIG. 10 is a perspective view of a prior art compact disk carrying case.
Figure 11:
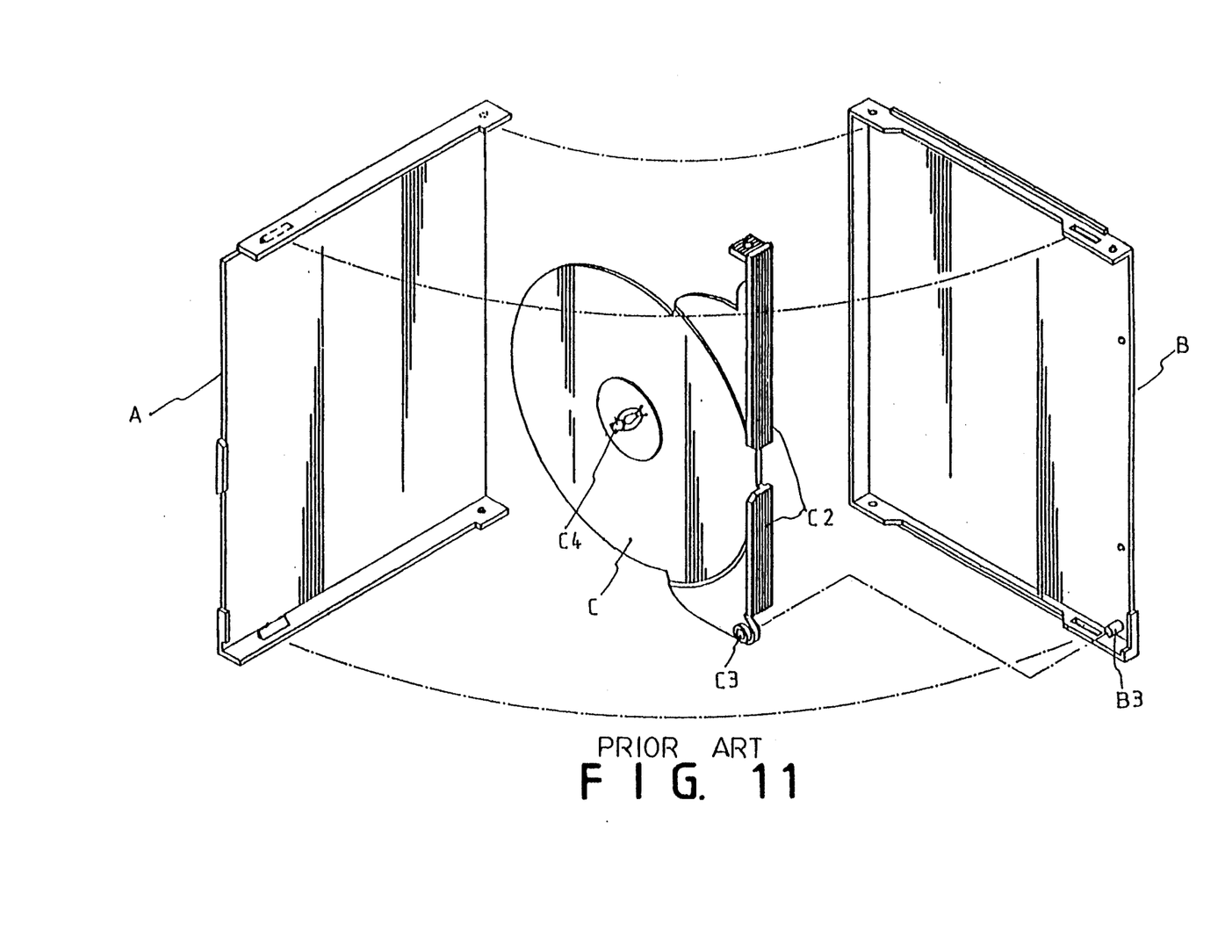
FIG. 11 is an exploded view of the prior art compact disk carrying case.

Hence, an improved compact disc carrying case has been developed to eliminate these drawbacks. As shown in FIGS. 10 and 11, the compact disc carrying case comprises a first cover A, a second cover B, and a disk holder C. The disk holder C is provided with an axle hole C3 at an corner and a retainer C4 at the center. The second cover B has a pin B3 adapted to engage with the axle hole C3 of the disk holder C thus enabling the disk holder C to be turned out of the carrying case for storing or retrieving the compact disk therefrom.

Nevertheless, both compact disk carrying cases still need a cabinet for storage hence increasing the burden to the user.

Therefore, it is an object of the present invention to provide a compact disc carrying case which can obviate and mitigate the above-mentioned drawbacks.

SUMMARY OF THE INVENTION

This invention relates to an improved compact disk carrying case.

It is the primary object of a compact disk carrying case which can be conveniently connected with a plurality of compact disk carrying cases as desired.

It is another object of the present invention to provide a compact disk carrying case which enables the compact disk to be stored or retrieved without picking up the carrying case.

It is still another object of the present invention to provide a compact disk carrying case which is simple and easy to manufacture.

It is still another object of the present invention to provide a compact disk carrying case which is low in cost.

It is a further object of the present invention to provide a compact disk carrying case which is durable in use.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
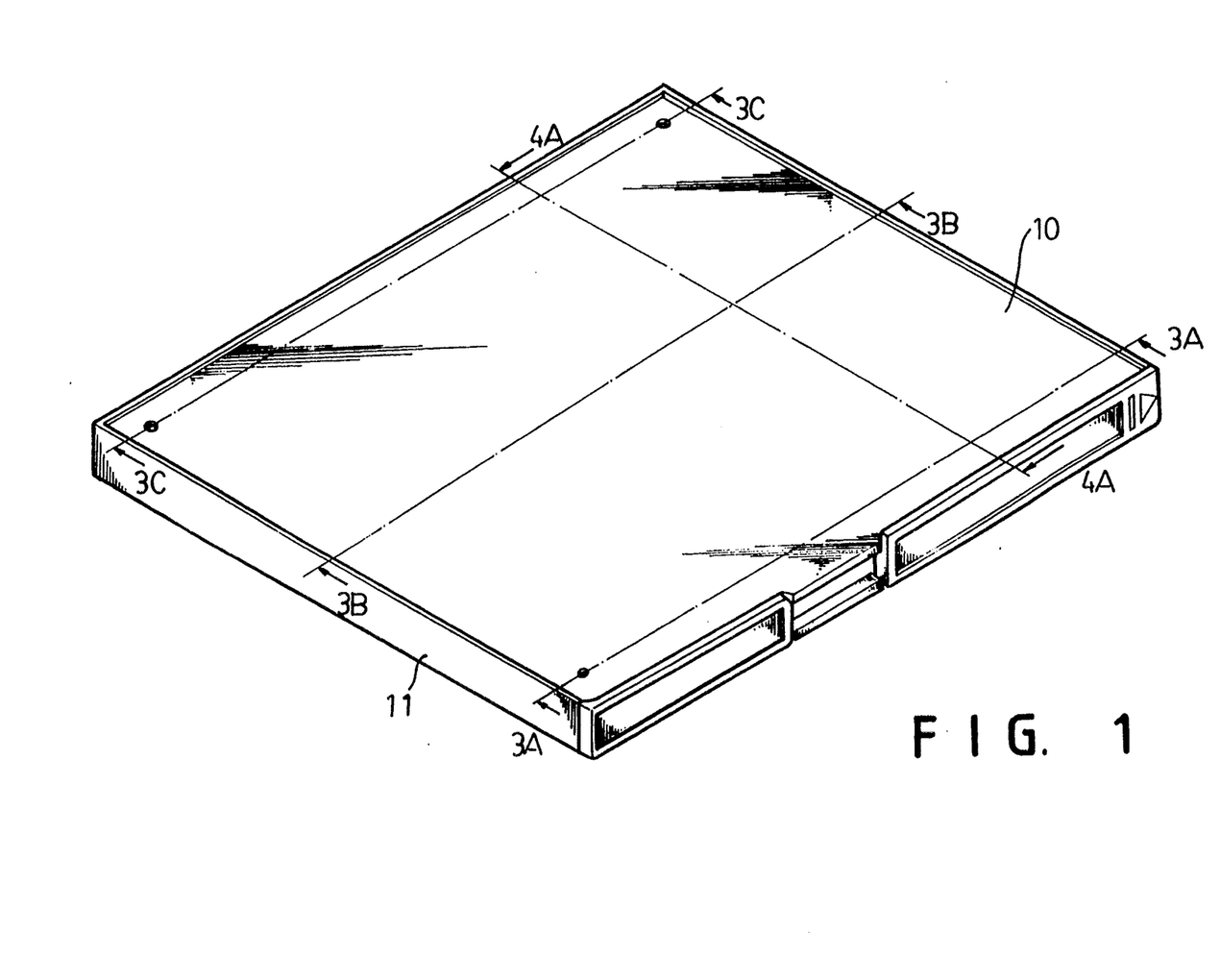
FIG. 1 is a perspective view of the present invention.
Figures 2, 2A:
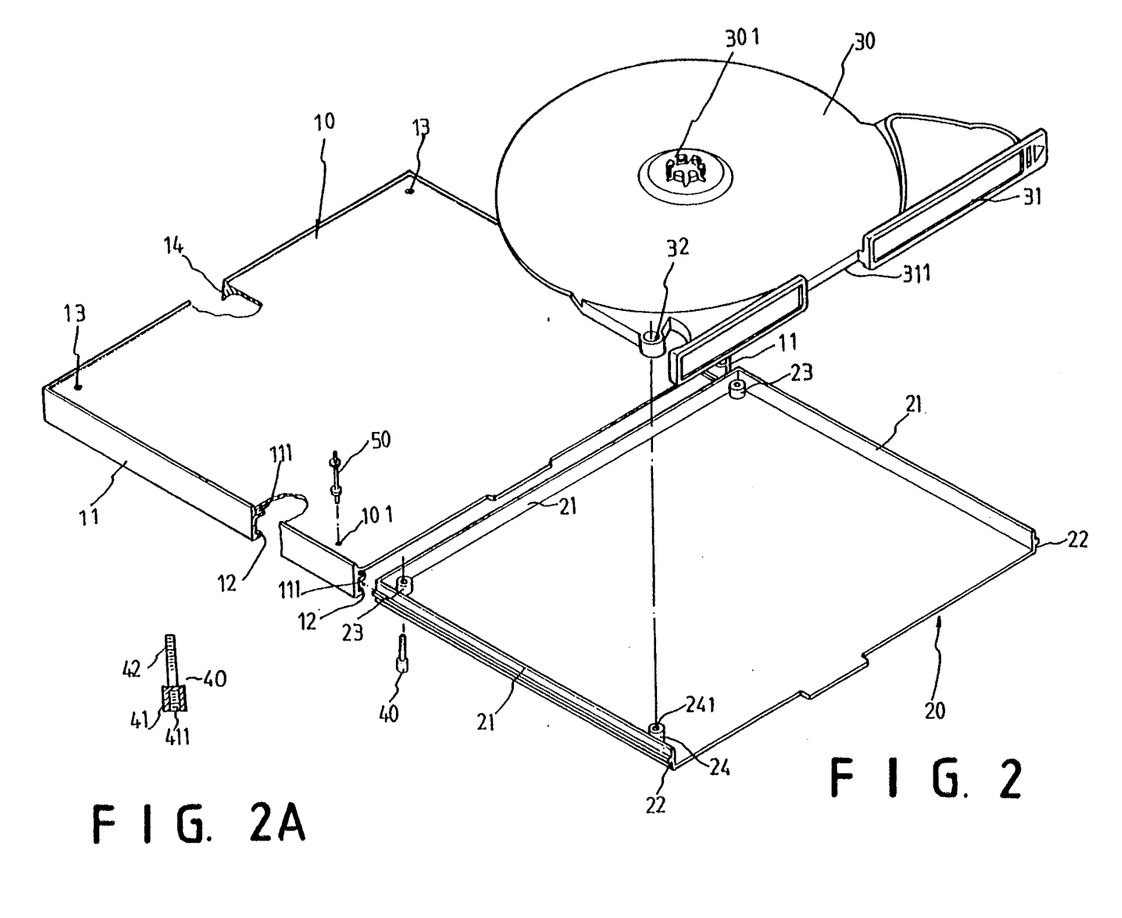
FIG. 2 is an exploded view of the present invention.
FIG. 2A is a sectional view of the securing bolt.

With reference to the drawings and in particular to FIGS. 1 and 2 thereof, the compact disk carrying case structured according to the present invention is shown. As illustrated, the compact disc carrying case comprises an upper cover 10, a lower cover 20, a disk holder 30, a connecting bolt 40, and a supporting pin 50. The upper cover 10 is formed with a left side and a right side walls 11 each having a flange 12 at the lower edge and a groove 111 close to the upper edge. The groove 111 is designed for keeping a song book, brochure, or the like. Further, the front end of the flange 12 is formed with a protuberance 121 (see FIG. 3A). The lower cover 20 includes a left side, a right side and a rear side walls 21. The left side and the right side walls 21 has a longitudinal projection at the intermediate portion thereby forming a shoulder 22 at the lower portion so that the longitudinal projection of the lower cover 20 is engageable with the groove 111 of the upper cover 10 thereby enabling the lower cover 20 to be slid out of the carrying case with respect to the upper cover 10. In addition, the front and rear ends of the shoulder 22 is formed with a cavity 221 (see FIG. 3A). The disk holder 30 is formed with a recess having a retainer 301 at the center for keeping a compact disk in place. The disk holder 30 further has a front side wall 31 with a notch 311, and a hole 32 at a corner close to the front side wall 31.

The upper cover 10 is formed with a rear side wall 14 which is one-half as high as the left and right side walls 11. At both rear corners of the upper cover 10 there is a hole 13. Further, the upper cover 10 has a hole 101 aligned with the hole 32 of the disk holder 30 (see FIGS. 1, 2 and 3A).

The lower cover 20 is provided at both rear corners with a cylindrical member 23 having a step hole 231 (see FIG. 3C) aligned with the hole 13 of the upper cover 10. Further, the lower cover 20 has a cylindrical member 24 having a hole 241 (see FIG. 3A) adapted to receive the pin 50. The cylindrical member 24 of the lower cover 20 is fitted in the opening 32 of the disk holder 30 so that the disk holder 30 can be turned out of the carrying case for storing or retrieving the compact disk.

Figure 3A:
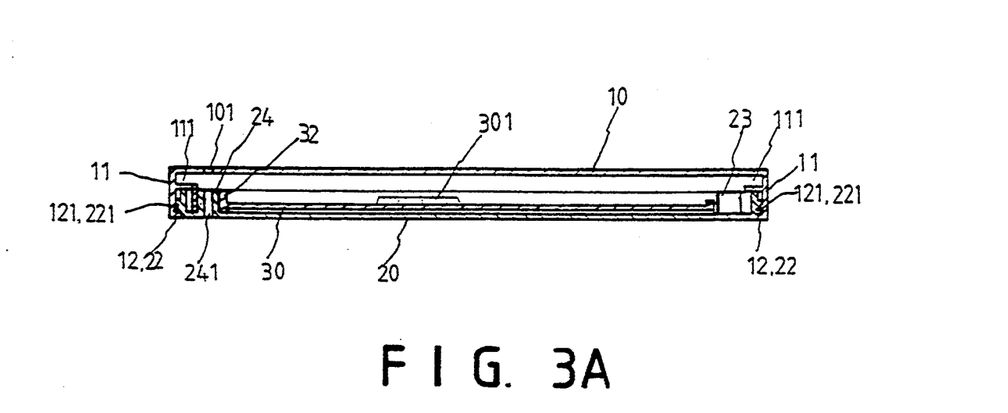
FIG. 3A is a sectional view taken along line 3A—3A of FIG. 1.
Figure 3B:
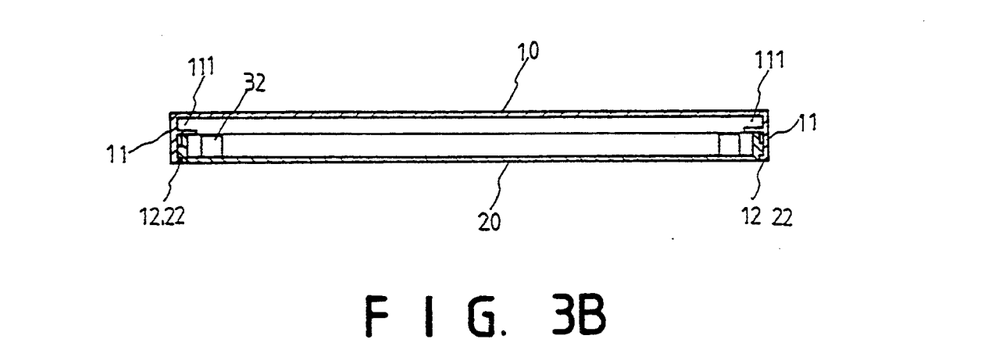
FIG. 3B is a sectional view taken along line 3B—3B of FIG. 1.
Figure 3C:
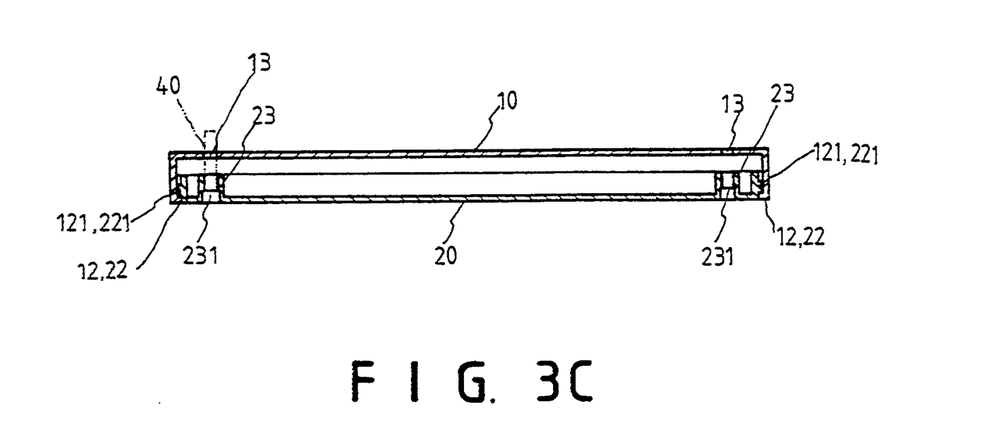
FIG. 3C is a sectional view taken along line 3C—3C of FIG. 1.
Figure 4A:
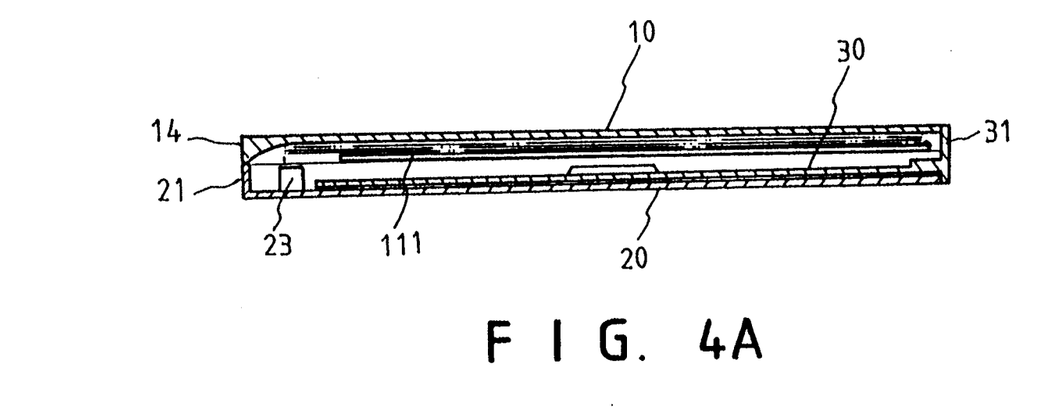
FIG. 4A is a sectional view taken along line 4A—4A of FIG. 1.
Figure 4B:
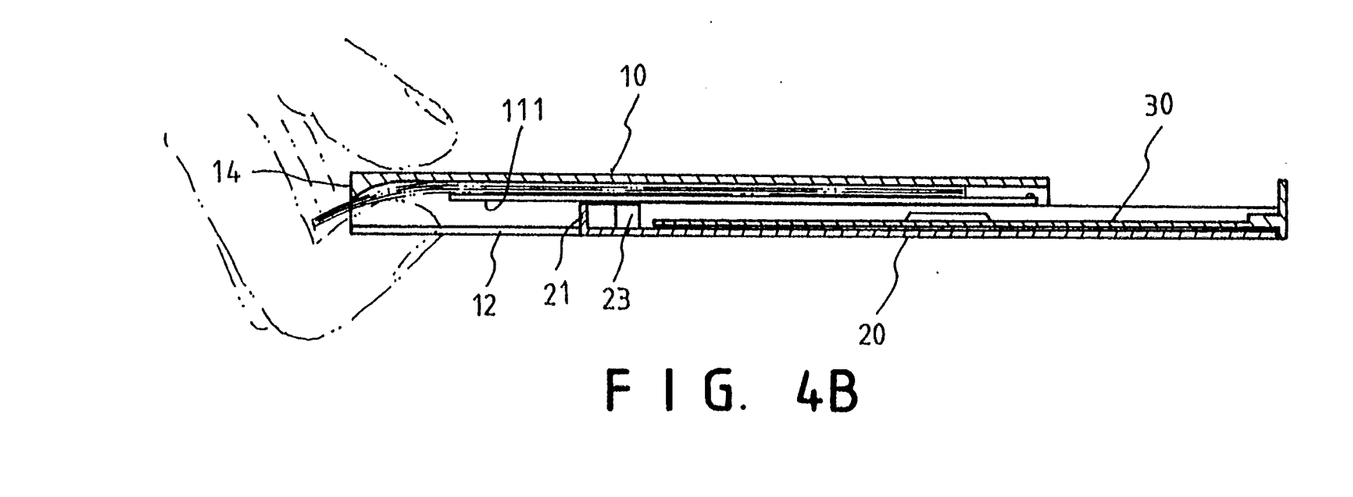
FIG. 4B shows the way to insert a song book into the present invention.
Figure 5:
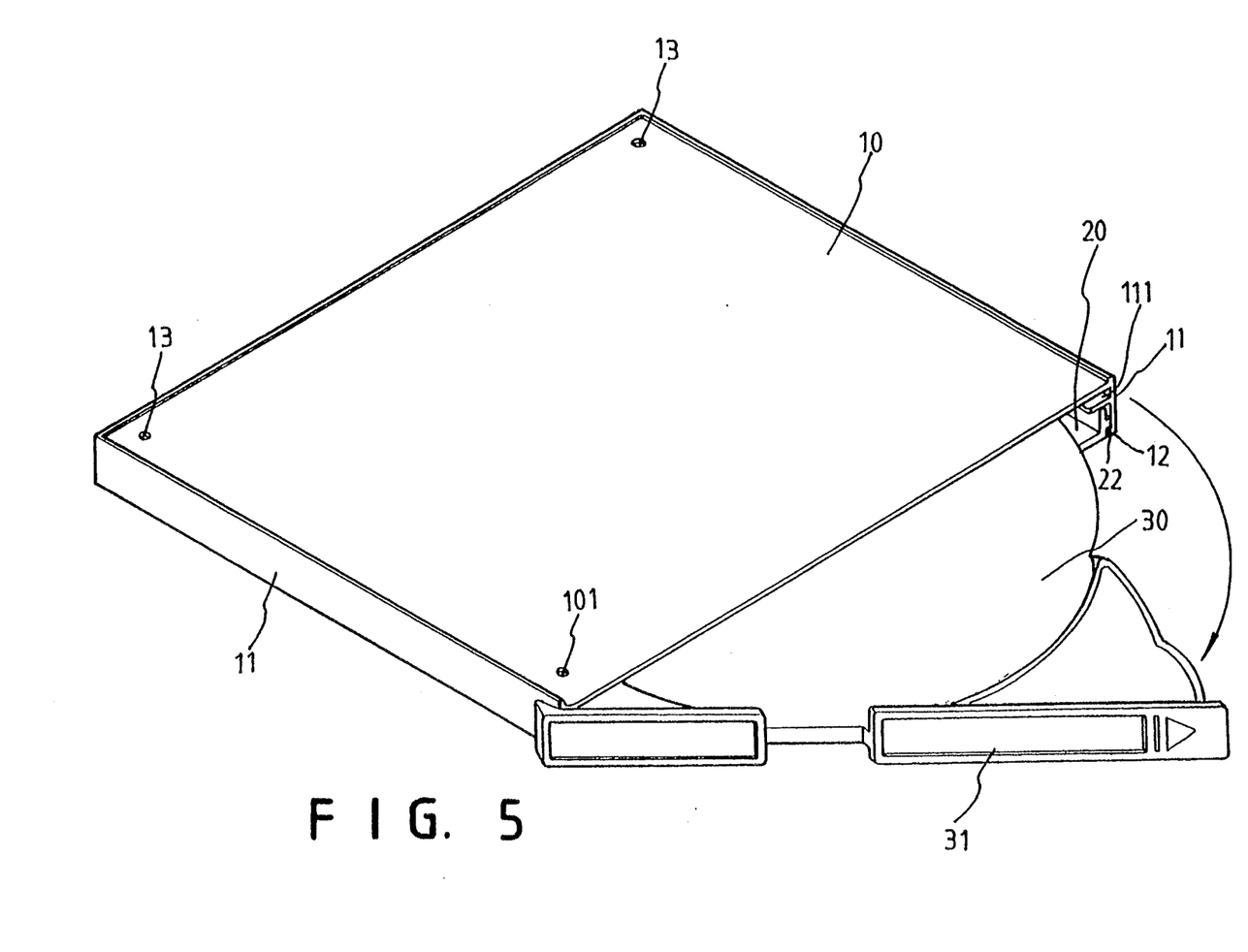
FIG. 5 shows the way to turn open the present invention.
Figure 6:
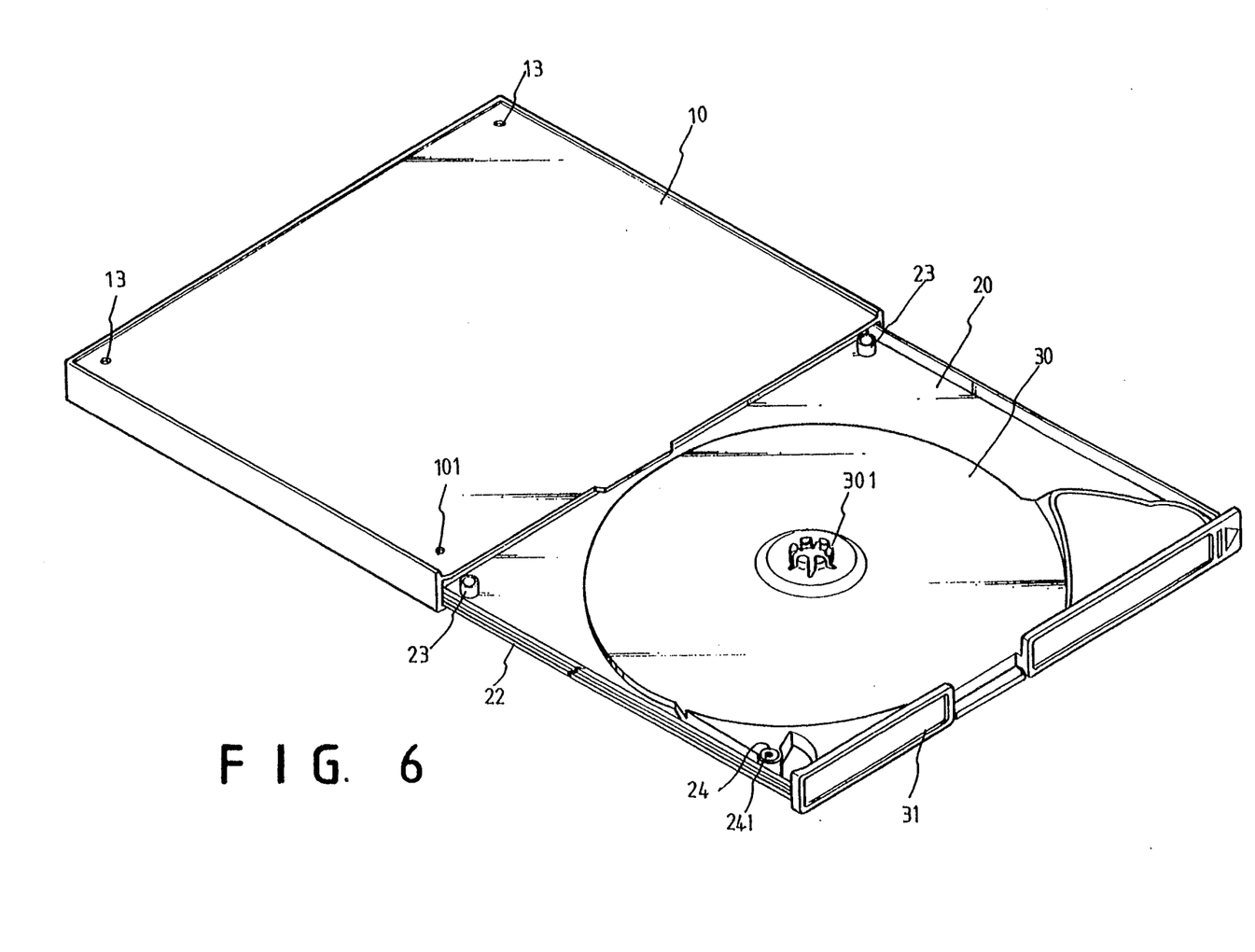
FIG. 6 shows the way to pull open the present invention.

As the upper cover 10, the lower cover 20 and the disk holder 30 are fitted together, the hole 13 of the upper cover 10 is aligned with the counterbored hole 231 of the lower cover 20 (see FIG. 3C) while the cylindrical member 24 extends upwardly through the hole 32 of the disk holder 30 with the hole 241 aligned with the hole 101 of the upper cover (see FIG. 3A). Hence, the disk holder 30 can be turned out of the carrying case as shown in FIG. 5, and the lower cover 20 can be pulled open as shown in FIG. 6.

Figure 7:
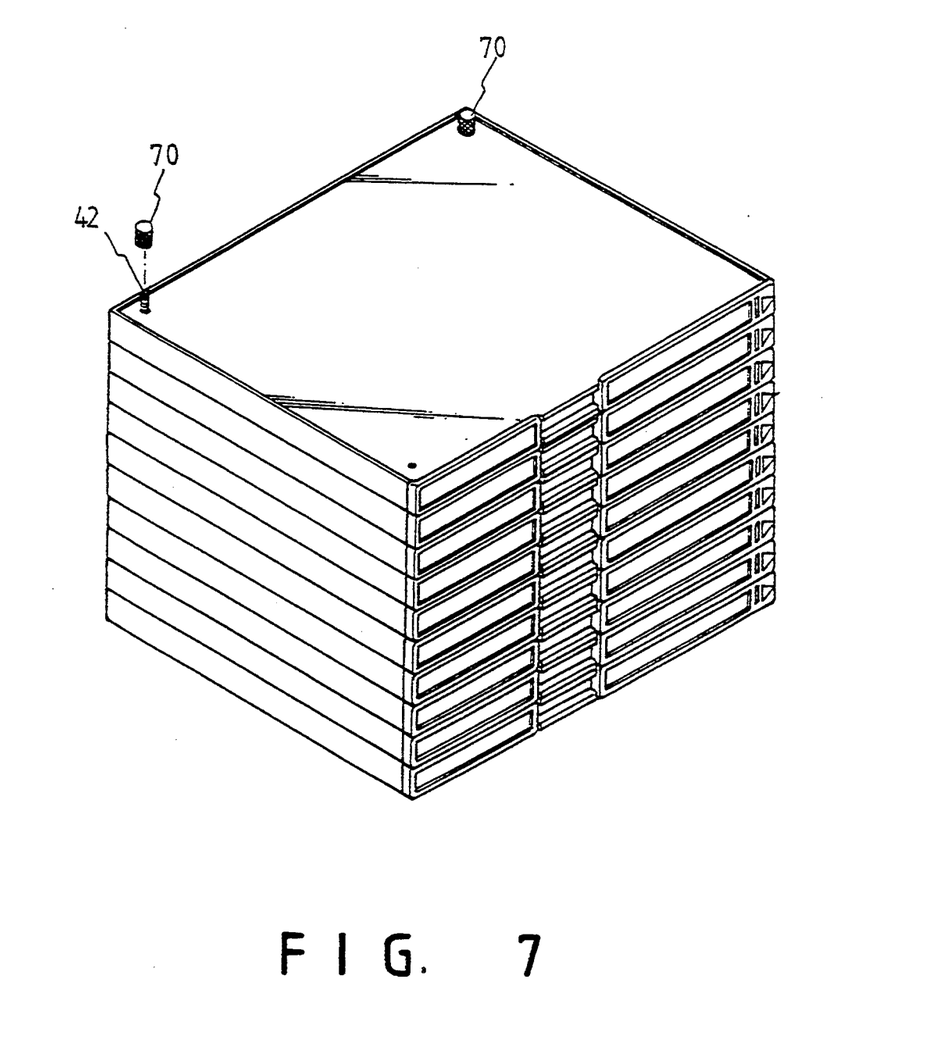
FIG. 7 illustrates a first application of the present invention.

A securing bolt 40 with a head 41 and a threaded rod portion 42 is inserted through the cylindrical member 23 of the lower cover 20 and the hole 13 of the upper cover 10. The securing bolt 40 is higher than the compact disk carrying case so that its upper end protrudes upwardly out of the upper cover 10. Further, the securing bolt 40 is formed with a threaded hole 411 at the lower end so that the threaded rod portion 42 of the securing bolt 40 can be connected with the threaded hole 411 of another securing bolt 40. The pin 50 is inserted into the cylindrical member 24 of the lower cover 20 through the hole 101 of the upper cover 10. Hence, a plurality of compact disk carrying case can be conveniently coupled thereby keeping them together as a storage cabinet shown in FIGS. 7, 8 or 9.

Figure 8:
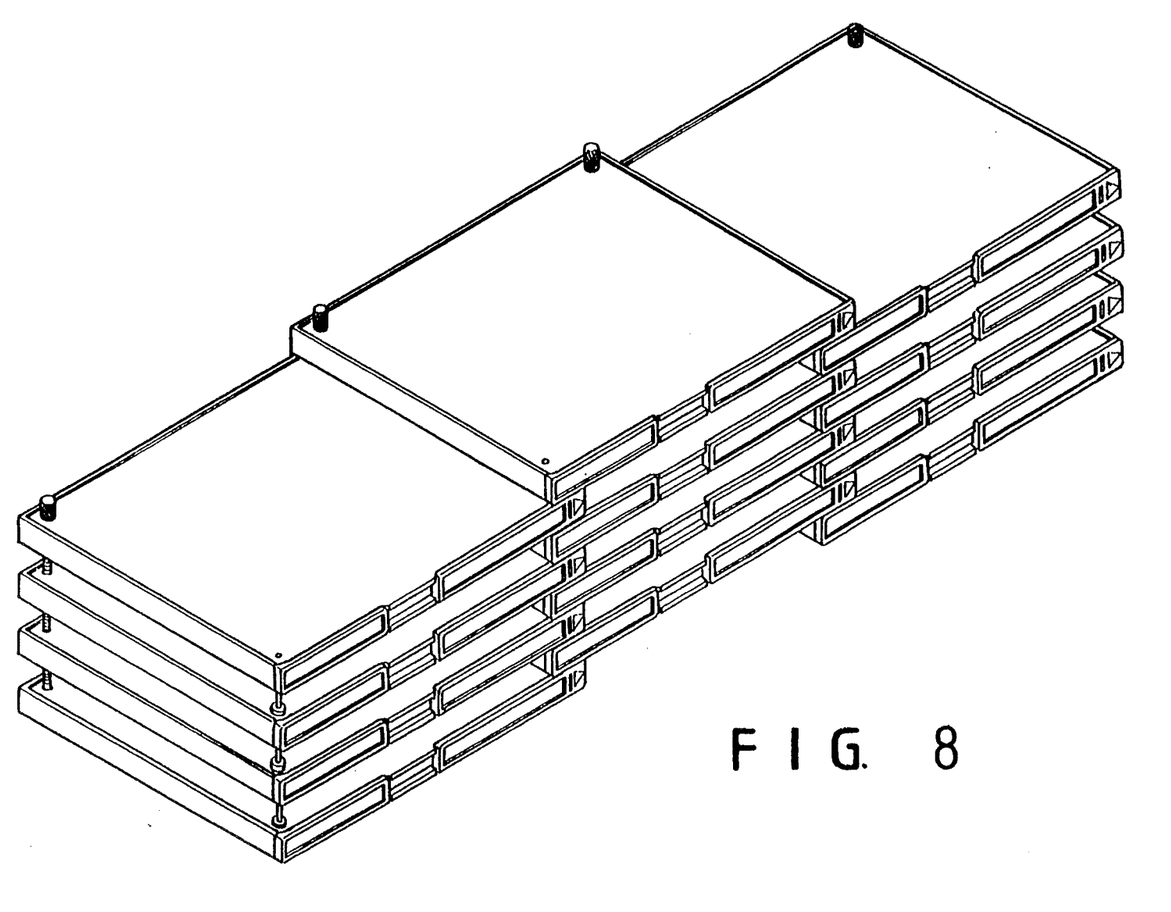
FIG. 8 illustrates a second application of the present invention.
Figure 9:
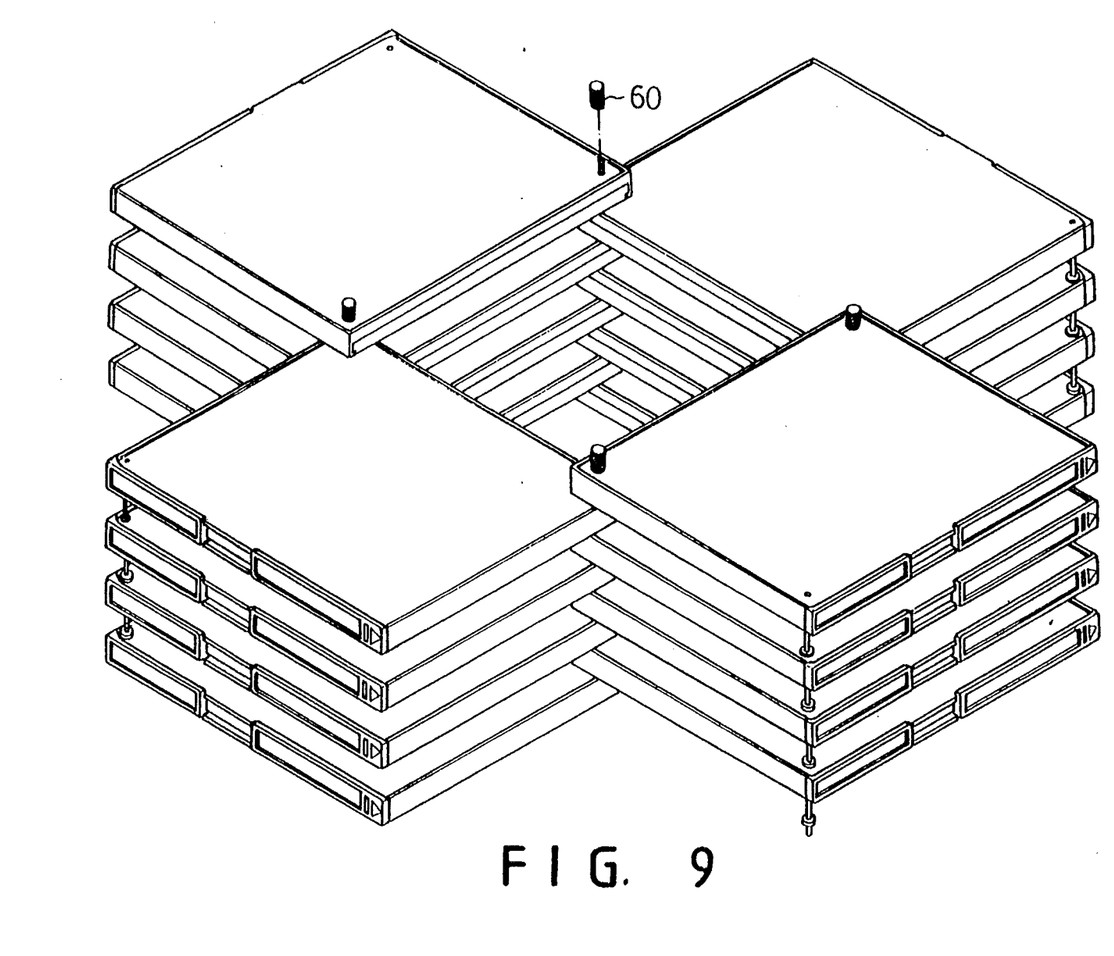
FIG. 9 illustrates a third application of the present invention.

In addition, the securing bolt 40 at the lowermost position can be connected with a castor 70 as shown in FIG. 8, while the securing bolt 40 at the uppermost position with a cap 60 as shown in FIG. 9.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A compact disc carrying case comprising:

an upper cover having a first hole at a front corner, a second hole at both rear corners, and a longitudinal groove at both sides;

a lower cover having at both sides a longitudinal projection slidably engaged with the longitudinal grooves of said upper cover and having a first cylindrical member with a counterbored hole at both rear corners and a second cylindrical member with a through hole at a front corner, said through hole being aligned with the first hole of said upper cover;

a disk holder fitted in said lower cover and having a retainer at a center; and a securing bolt having a threaded rod and a head with a threaded hole and inserted into the counterbored hole of said lower cover, the threaded rod of said securing bolt protruding upwardly out of said upper cover.

2. The compact disk carrying case as claimed in claim 1, wherein said disk holder is pivotally connected with the cylindrical member of said lower cover.

3. The compact disk carrying case as claimed in claim 1, further comprising a supporting pin with an enlarged portion close to both ends and adapted to be inserted between the first hole of said upper cover and a through hole of a lower cover of another carrying case.

* * * * *